United States Patent [19]

Sezume et al.

[11] Patent Number: 5,106,909

[45] Date of Patent: Apr. 21, 1992

[54] MODIFIED POLYOLEFIN-POLYESTER GRAFT COPOLYMER, METHOD OF PRODUCING SAME AND THERMOPLASTIC RESIN COMPOSITION CONTAINING SUCH GRAFT COPOLYMER

[75] Inventors: Tadahi Sezume; Shigeru Sato; Masahiro Oosawa, all of Yokohama; Yasuhiko Haraguchi, Higashimatsuyama; Takashi Mikami, Komae; Takeyoshi Nishio, Toyota; Toshio Yokoi, Toyota; Takao Nomura, Toyota; Nobuya Kawamura, Toyota, all of Japan

[73] Assignee: Tonen Sekiyukagaku Kabushiki Kaisha, Tokyo, Japan

[21] Appl. No.: 420,860

[22] Filed: Oct. 13, 1989

[30] Foreign Application Priority Data

Oct. 14, 1988 [JP] Japan ................... 63-258883
Oct. 14, 1988 [JP] Japan ................... 63-258884
Jul. 13, 1989 [JP] Japan ................... 1-181278

[51] Int. Cl.⁵ .............................. C08G 81/02
[52] U.S. Cl. .......................... 525/176; 525/64; 525/67; 525/69; 525/92
[58] Field of Search ................. 525/64, 92, 176

[56] References Cited

U.S. PATENT DOCUMENTS 4,172,859 10/1979 Epstein ....................... 525/176

FOREIGN PATENT DOCUMENTS 0092728 11/1983 European Pat. Off. .
0106027 4/1984 European Pat. Off. .
57-108151 7/1982 Japan .
57-108152 7/1982 Japan .
57-111351 7/1982 Japan .
61-215649 9/1986 Japan .
61-225245 10/1986 Japan .
61-235456 10/1986 Japan .
61-238847 10/1986 Japan .
8604076 7/1986 PCT Int'l Appl. ................... 525/64

OTHER PUBLICATIONS

Modern Plastics Encyclopedia, pp. 49, 50, 52, 1979-1980.
Okasaka et al., Chemical Abstracts, 87, No. 2, (Jul. 11, 1977).

Primary Examiner—Patricia Short
Attorney, Agent, or Firm—Armstrong, Nikaido, Marmelstein, Kubovcik & Murray

[57] ABSTRACT

A modified polyolefin-polyester graft copolymer includes (a) 10-90 parts by weight of a polyester having an intrinsic viscosity $[\eta]$ of 0.30-1.20 and an end carboxyl group content of 15-200 milliequivalent/kg, and (b) 90-10 parts by weight of a modified polyolefin having 0.2-5 mol % of an epoxy group or carboxyl group content and a weight-average molecular weight of 8,000-140,000.

A thermoplastic resin composition includes (a) 5-95 weight % of an aromatic polycarbonate, (b) 95-5 weight % of a polyolefin, and (c) 1-30 parts by weight, per 100 parts by weight of (a)+(b), of the graft copolymer.

4 Claims, No Drawings

MODIFIED POLYOLEFIN-POLYESTER GRAFT COPOLYMER, METHOD OF PRODUCING SAME AND THERMOPLASTIC RESIN COMPOSITION CONTAINING SUCH GRAFT COPOLYMER

BACKGROUND OF THE INVENTION

The present invention relates to a modified polyolefin-polyester graft copolymer effective as a compatibilizer for polycarbonate resins and polyolefins, and a method of producing such modified polyolefin-polyester graft copolymer, and more particularly to a graft copolymer of a polyester having particular intrinsic viscosity $[\eta]$ and end carboxyl group content and a modified polyolefin having epoxy groups or carboxyl groups, and a method of producing such a graft copolymer. It further relates to a polycarbonate-polyolefin thermoplastic resin composition containing such a graft copolymer with a well-balanced combination of rigidity, impact resistance, thermal deformation resistance, moldability, surface peel resistance, solvent resistance, etc.

Aromatic polycarbonates have excellent impact strength, heat resistance, rigidity and dimension stability, but they are poor in solvent resistance and moldability. To overcome these problems, attempts have been made to provide polycarbonate compositions with polyolefins. However, since polyolefins and polycarbonates do not have good compatibility, proposals have been made to add various third components to improve their compatibility.

Japanese Patent Laid-Open No. 57-108151 discloses a polycarbonate resin composition comprising 100 parts by weight of a polycarbonate resin, 0.3-20 parts by weight of polyethylene and 0.3-20 parts by weight of a butyl rubber.

Japanese Patent Laid-Open No. 57-108152 discloses a polycarbonate resin composition comprising 0.3-20 parts by weight of an ethylene-propylene copolymer and/or an ethylene-propylene-diene copolymer as a third component.

Japanese Patent Laid-Open No. 57-111351 discloses a polycarbonate resin composition comprising 0.3-20 parts by weight of an isoprene rubber and/or a methylpentene polymer as a third component.

The polycarbonate resin compositions disclosed in Japanese Patent Laid-Open Nos. 57-108151, 57-108152 and 57-111351, however, suffer from drastic decrease in impact strength and surface peel of molded products when polyolefin content increases.

Japanese Patent Laid-Open No. 61-215649 discloses a polycarbonate-polyolefin composition comprising as a third component an olefin-vinyl ester copolymer, for instance, an ethylene-vinyl acetate copolymer [EVA resin], etc.

However, this composition also shows poor impact strength due to the low compatibility of the polycarbonate and the polyolefin, suffering from surface peel, although it has relatively good solvent resistance.

Japanese Patent Laid-Open Nos. 61-225245, 61-235456 and 61-238847 disclose compositions comprising aromatic polycarbonates, polyesters and/or modified polyolefins, etc. However, since no unmodified polyolefin is contained in these compositions, they are poor in solvent resistance.

As described above, although thermoplastic resin compositions based on polycarbonates and polyolefins whose compatibility is improved and which passes an excellent balance of mechanical strength, moldability, solvent resistance, etc. are desired for automobile parts, etc., satisfactory compositions have never been provided.

OBJECT AND SUMMARY OF THE INVENTION

An object of the present invention is, therefore, to provide a graft copolymer effective as a compatibilizer for a polycarbonate resin and a polyolefin.

Another object of the present invention is to provide a method of producing such a graft copolymer.

A further object of the present invention is to provide a composition of a polycarbonate resin and a polyolefin containing a compatibilizer therefor, which has a well-balanced combination of mechanical strength, impact strength, thermal deformation resistance, moldability, surface peel resistance, solvent resistance, etc.

As a result of intense research in view of the above objects, it has been found that a graft copolymer consisting of a polyester and a modified polyolefin containing epoxy groups or carboxyl groups is highly effective as a compatibilizer for the polycarbonate resin and the polyolefin, and that the addition of a proper amount of such a graft copolymer to aromatic polycarbonate-polyolefin compositions can provide the thermoplastic resin compositions with a well-balanced combination of mechanical properties, thermal deformation resistance, moldability, solvent resistance, etc. The present invention has been completed based on these findings.

The modified polyolefin-polyester graft copolymer according to the present invention comprising the reaction product of (a) 10–90 parts by weight of a polyester having an intrinsic viscosity $[\eta]$ of 0.30–1.20 and an end carboxyl group content of 15–200 milliequivalent/kg, and (b) 90–10 parts by weight of a modified polyolefin having 0.2–5 mol.% of an epoxy group or carboxyl group content and a weight-average molecular weight of 8,000–140,000 said modified polyolefin being a random copolymer of an olefin and an unsaturated monomer containing an epoxy group or a carboxyl group.

The method of producing a modified polyolefin-polyester graft copolymer according to the present invention comprises the step of reacting (a) 10–90 parts by weight of a polyester having an intrinsic viscosity $[\eta]$ of 0.30–1.20 and an end carboxyl group content of 15–200 milliequivalent/kg, with (b) 90–10 parts by weight of a modified polyolefin having a 0.2–5 mol.% of epoxy groups or carboxyl groups and a weight-average molecular weight of 8,000–40,000, at 260°–320° C. in an extruder.

The thermoplastic resin composition according to the weight present invention comprises (a) 5–95 weight % of an aromatic polycarbonate, (b) 95–5 weight % of a polyolefin, and (c) 1–30 parts by weight, per 100 parts by weight of (a)+(b), of a modified polyolefin-polyester graft copolymer comprising (i) a modified polyolefin having a 0.2–5 mol.% of epoxy groups or carboxyl groups and a weight-average molecular weight of 8,000–140,000, and (ii) a polyester having an intrinsic viscosity $[\eta]$ of 0.30–1.20 and an end carboxyl group content of 15–200 milliequivalent/kg.

DETAILED DESCRIPTION OF THE INVENTION

Aromatic polycarbonates which can be used in the present invention may be produced by [a] a reaction between a bivalent phenol and a carbonate precursor such as phosgene in the presence of an acid acceptor and a molecular weight modifier, or (b) a transesterification reaction between a bivalent phenol and a carbonate precursor such as a diphenyl carbonate. The bivalent phenols which can be used are preferably bisphenols, particularly 2,2-bis [4-hydroxyphenyl]propane [bisphenol A]. Part or total of bisphenol A may be replaced by other bivalent phenols. The other bivalent phenols a than bisphenol A include hydroquinone, 4,4'-dihydroxydiphenyl, bis [4-hydroxyphenyl] alkane, bis [4-hydroxyphenyl]cycloalkane, bis [4-hydroxyphenyl] sulfide, bis [4-hydroxyphenyl] sulfone, bis [4-hydroxyphenyl] sulfoxide, bis [4-hydroxyphenyl] ketone, bis [4-hydroxyphenyl] ether, etc. and halogenated bisphenols such as bis [3,5-dibromo-4-hydroxyphenyl] propane. Homopolymers or copolymers of these bivalent phenols or their mixtures may also be used. Such polycarbonate resins are commercially available.

The aromatic polycarbonates preferably have a weight-average molecular weight of 10,000–100,000. When the weight-average molecular weight is less than 10,000, sufficient mechanical properties cannot be provided, and when it exceeds 100,000, the moldability decreases. The more preferable weight-average molecular weight is 20,000–50,000.

Polyolefins which can be used in the present invention include polyethylene [high-density polyethylene, low-density polyethylene, linear low-density polyethylene, etc.], polypropylene, polybutene-1, poly-4-methylpentene-1 and other α-olefin polymers, and the preferred polyolefin is polypropylene. Incidentally, the polyolefin needs not be a homopolymer. For instance, in the case of polypropylene, it may be a copolymer of propylene with up to 20 weight % of other one or more α-olefins. The preferred comonomers for the propylene copolymer include ethylene. The copolymers may be random copolymers, block copolymers or graft copolymers. The weight-average molecular weight of the polyolefin is preferably 10,000–1,000,000, and more preferably 30,000–300,000.

The graft copolymers used in the present invention are those produced from modified polyolefins and polyesters.

The modified polyolefins are polyolefins modified with unsaturated monomers containing epoxy groups or carboxyl groups.

The unsaturated monomers containing epoxy groups include glycidyl methacrylate, glycidyl acrylate, etc.

The unsaturated monomers containing carboxyl groups include unsaturated carboxylic acids or their anhydrides, for instance, monocarboxylic acids such as acrylic acid, methacrylic acid, etc., dicarboxylic acids such as maleic acid, fumaric acid, itaconic acid, etc., dicarboxylic anhydrides such as maleic anhydride, itaconic anhydride, etc. Particularly, dicarboxylic acids and their anhydrides are preferable.

The olefins which are copolymerizable with the above unsaturated monomers containing epoxy groups or carboxyl groups include olefins such as ethylene, propylene, butene-1, pentene-1, etc., and these olefins may be used alone or in combination. Incidentally, the olefins may contain 10 weight % or less of other monomers such as vinyl acetate, isoprene, chloroprene, butadiene, etc., if necessary. Among them, a copolymer of glycidyl methacrylate and ethylene is particularly preferable.

The modified polyolefins containing epoxy groups or carboxyl groups may be in the form of block copolymers, graft copolymers, random copolymers or alternating copolymers.

The modified polyolefin has a weight-average molecular weight of 8,000–140,000 and an epoxy group or carboxyl group content of 0.2–5 mol. %.

Incidentally, the weight-average molecular weight is measured by a gel permeation chromatography [GPC], and a measured value is converted to a weight-average molecular weight of an unmodified polyolefin. The epoxy group or carboxyl group content is determined from an oxygen element analysis. When the weight-average molecular weight is lower than 8,000, sufficient effects on improving the compatibility cannot be obtained, and when it exceeds 140,000, the modified polyolefin shows a high melt viscosity, resulting in poor moldability.

With respect to the content of epoxy groups or carboxyl groups, when it is lower than 0.2 mol. %, the modified polyolefin shows poor reactivity with the polyester, making it difficult to produce the desired graft copolymer. When the epoxy group or carboxyl group content exceeds 5 mol %, the modified polyolefin shows too high reactivity with the polyester, increasing the melt viscosity of the reaction product, which in turn leads to the production of gel-like products.

The polyesters which may be used in the present invention to prepare the graft copolymers are generally thermoplastic resins consisting of saturated dicarboxylic acids and saturated bivalent alcohols. Their examples include polyethylene terephthalate, polypropylene terephthalate, polytetramethylene terephthalate [polybutylene terephthalate], polyhexamethylene terephthalate, polycyclohexane-1,4-dimethylol terephthalate, polyneopentyl terephthalate, etc. Among them, polyethylene terephthalate and polybutylene terephthalate are particularly preferable.

The polyesters should have an intrinsic viscosity [η] of 0.30–1.20 and an end carboxyl group content of 15–200 milliequivalent/kg. Here, the intrinsic viscosity [η] (dl/g) is determined from a solution viscosity measured in an o-chlorophenol solvent at 25° C.

When the intrinsic viscosity [η] of the polyester is lower than 0.30, sufficient effects on improving the compatibility cannot be achieved, and when it exceeds 1.20, the reaction products show too high melt viscosity, resulting in difficulty in molding. With respect to the concentration of end carboxyl groups, when it is lower than 15 milliequivalent/kg, the polyester shows poor reactivity with the modified polyolefin. On the other hand, when it exceeds 200 milliequivalent/kg, too high reactivity with the modified polyolefin is obtained, which in turn contributes to the formation of gels.

Particularly, in the case of the polyethylene terephthalate, it should have an intrinsic viscosity [η] of 0.30–0.80, and an end carboxyl group content of 15–200 milliequivalent/kg. When the intrinsic viscosity [η] exceeds 0.80, the resulting graft copolymers show too high melt viscosity, leading to the formation of gels. Incidentally, the terephthalic acid component in the polybutylene terephthalate may be substituted by an alkyl group, a halogen group, etc., and the glycol component may contain, in addition to ethylene glycol, up to about 50 weight % of other glycols such as 1,4-butylene glycol, propylene glycol, hexamethylene glycol, etc.

In the case of the polybutylene terephthalate, it should have an intrinsic viscosity [η] of 0.30–1.20, and an end carboxyl group content of 15–200 milliequivalent/kg. The terephthalic acid component may also be substituted by an alkyl group, a halogen group, etc., and the glycol component may contain, in addition to 1,4-butylene glycol, up to about 50 weight % of other glycols such as ethylene glycol, propylene glycol, hexamethylene glycol, etc.

To carry out the graft polymerization of the polyester and the modified polyolefin, they are dry-blended and then blended in a molten state at 260-320° C. for 0.5-15 minutes. The melt blending is carried out in an extruder, particularly a double-screw extruder. When the reaction temperature is lower than 260° C., a sufficient graft ratio cannot be achieved, and when it exceeds 320° C., excessive reaction takes place, resulting in the clogging of the extruder by the formation of gels, and the deterioration of the polyolefins.

The proportion of the polyester to the modified polyolefin is 10-90 parts by weight to 90-10 parts by weight, preferably 15-85 parts by weight to 85-15 parts by weight. When the polyester is lower than 10 parts by weight or exceeds 90 parts by weight, the amount of the graft copolymer formed decreases.

The modified polyolefin-polyester graft copolymer thus prepared is used as a compatibilizer for the polycarbonate resins and the polyolefins.

In the present invention, a weight ratio of the polyolefin to the aromatic polycarbonate is 95%-5%/- 5%-95% by weight. When the aromatic polycarbonate is less than 5 weight %, sufficient impact strength and mechanical strength cannot be obtained, and when it exceeds 95 weight %, the moldability and the solvent resistance decrease. Preferably, the polyolefin is 90-10 weight %, and the polycarbonate is 10-90 weight %. More preferably, the polyolefin is 80-20 weight %, and the polycarbonate is 20-80 weight %.

The amount of the graft copolymer added is 1-30 parts by weight per 100 parts by weight of the polyolefin + the aromatic polycarbonate. When it is less than 1 part by weight, sufficient effects on improving the compatibility between the aromatic polycarbonates and the polyolefins cannot be achieved, and when it exceeds 30 parts by weight, the mechanical properties such as impact resistance, etc. of the composition decrease dramatically. The preferred amount of the graft copolymer is 1-10 parts by weight.

In order to further improve the impact resistance, the thermoplastic resin composition of the present invention may further contain low-crystallinity ethylene-α-olefin copolymers, acryl elastomers, butyl rubbers, etc. in amounts of 100 parts by weight or less per 100 parts by weight of the aromatic polycarbonate + the polyolefin. The low-crystallinity ethylene-α-olefin copolymers may be copolymers of ethylene and α-olefins such as propylene, butylene, pentene, etc., and particularly preferable low-crystallinity ethylene-α-olefin copolymers are an ethylene-propylene rubber and an ethylene-butylene rubber. A weight ratio of ethylene to α-olefin is usually 20:80-85:15.

The thermoplastic resin compositions of the present invention may further contain other additives such as reinforcing materials such as glass fibers, carbon fibers, etc., inorganic fillers, thermostabilizers, anti-oxidants, photostabilizers, flame retarders, plasticizers, anti-static agents, parting agents, foaming agents, nucleating agents, etc. to improve their properties.

The thermoplastic resin compositions of the present invention may be produced by blending in a molten state by using a single-screw extruder, a double-screw extruder, a Banbury mixer, a kneading roll, a Brabender, a kneader, a Henschel mixer, etc.

As described above, the polycarbonate and the polyolefin do not have good compatibility, but the modified polyolefin is highly compatible with the polyolefin. In addition, the aromatic polycarbonate is compatible with the polyester by a transesterification reaction therebetween in the process of blending. Accordingly, by blending the aromatic polycarbonate, the polyolefin, and the graft copolymer of the modified polyolefin and the polyester, the graft copolymer is selectively transferred into the boundaries between the aromatic polycarbonate and the polyolefin, whereby good compatibility between the aromatic polycarbonate and the polyolefin can be achieved. As a result, the thermoplastic resin composition is provided with a good balance of mechanical properties, thermal deformation resistance, moldability, surface peel resistance, solvent resistance, etc.

Incidentally, by restricting the intrinsic viscosity $[\eta]$ and the end carboxyl group content of the polyester and the epoxy group or carboxyl group content and the weight-average molecular weight of the modified polyolefin to particular ranges, a graft reaction between the polyester and the modified polyolefin can be easily controlled, thereby preventing excess reaction which leads to the formation of gels. Accordingly, since an extreme decrease in MFR can be prevented, the graft copolymers can serve as good compatibilizers.

The present invention will be explained in further detail referring to the following Examples.

The measurement of the properties of the thermoplastic resin compositions was conducted in each Example and Comparative Example as follows:

(1) Intrinsic viscosity $[\eta]$

Determined from a solution viscosity measured in an o-chlorophenol solvent at 25° C.

(2) End carboxyl group content

A solution of a polyester in a benzylalcohol was diluted with chloroform, and titration was conducted with a 0.1-N sodium hydroxide solution in benzylalcohol using a 0.1-% phenol red alcohol solution as an indicator to determine the end carboxyl group content.

(3) Epoxy group and carboxyl group content

Determined from an oxygen element analysis.

(4) Weight-average molecular weight

Measured by a GPC method and expressed as a polyethylene-converted value.

(5) MFR

Measured at 280° C. under a load of 2160 g or 21.6 kg.

(6) Gelation

A film of about 100 μm in thickness was produced by pressing and the existence of gels was observed with the naked eye.

(7) Clogging of extruder with resin

Using a double-screw extruder of 45 mm in diameter, a gel reaction was conducted at a discharge speed of 30 kg/hour for 1 hour to observe whether or not the die of the extruder was clogged with gels.

(8) Graft ratio

A component insoluble in both m-cresol (100° C.) and xylene (100° C.) was isolated as a graft copolymer to determine the graft ratio.

9) Thermal deformation temperature

Measured according to JIS K7207, and shown by a temperature at which a test piece (cantilever) was deformed by a predetermined amount (0.25 mm) under a constant load (4.6 kg/cm$^2$) when the temperature was elevated at a constant rate of 2° C./min.

(10) Dynamic melt viscosity

Measured by a dynamic spectrometer of Rheometrix at 250° C. or 280° C. and 100 rad/sec.

(11) Solvent resistance (weight change by immersion in methanol)

Each sample was immersed in methanol at 25° C. for 30 days and the change in its weight was measured.

(12) Surface peel resistance

The surface of each sample was cut by a razor in a checkered pattern to have 100 checkers of 1 mm ×1 mm. An adhesive cellophane tape (manufactured by Nichiban Co., Ltd.) was adhered onto the sample surface and then peeled off. The number of remaining checkers was counted.

EXAMPLES 4-6

Copolymers were produced in the same manner as in Examples 1-3 except for using polybutylene terephthalate having various intrinsic viscosities [η] and end carboxyl group contents as a polyester, and the same measurements were conducted. The results are shown in Table 1.

EXAMPLE 7

A copolymer was produced in the same manner as in Example 1 except for using a mixture of 50 weight % of polyethylene terephthalate having an intrinsic viscosity [η] of 0.62 and an end carboxyl group content of 37 milliequivalent/kg and 50 weight % of polybutylene terephthalate having an intrinsic viscosity [η] of 0.65 and an end carboxyl group content of 68 milliequivalent/kg as a polyester, and the same measurements were conducted. The results are shown in Table 1.

EXAMPLES 8-10

Copolymers were produced in the same manner as in Example 1 except for changing the weight ratio of polyethylene terephthalate to modified polyethylene (random copolymer of glycidyl methacrylate and ethylene) to 50/50 (Example 8), 90/10 (Example 9) and 10/90 (Example 10), respectively, and the properties of the resulting products were similarly measured. The results are shown in Table 1.

TABLE 1

| Composition | 1 | 2 | 3 | 4 | 5 | 6 | 7 | 8 | 9 | 10 |
|---|---|---|---|---|---|---|---|---|---|---|
| Polyester | | | | | | | | | | |
| *Intrinsic Viscosity [η]* | | | | | | | | | | |
| PET$^{(1)}$ | 0.62 | 0.62 | 0.62 | — | — | — | 0.62 | 0.62 | 0.62 | 0.62 |
| PBT$^{(2)}$ | — | — | — | 0.80 | 0.65 | 0.51 | 0.65 | — | — | — |
| *End Carboxyl Group (m-eq./kg)* | | | | | | | | | | |
| PET$^{(1)}$ | 37 | 37 | 37 | — | — | — | 37 | 37 | 37 | 37 |
| PBT$^{(2)}$ | — | — | — | 54 | 68 | 92 | 68 | — | — | — |
| Modified Polyethylene | | | | | | | | | | |
| Weight-Average Molecular Weight | 48000 | 21000 | 48000 | 48000 | 48000 | 48000 | 48000 | 48000 | 48000 | 48000 |
| Epoxy Group content (mol %) | 2.5 | 2.5 | 1.0 | 2.5 | 2.5 | 2.5 | 2.5 | 2.5 | 2.5 | 2.5 |
| Properties of Graft Copolymer | | | | | | | | | | |
| *MFR (g/10 minutes)* | | | | | | | | | | |
| (3) | — | — | — | 0.8 | 1.4 | 2.6 | — | — | — | — |
| (4) | 3 | 45 | 18 | — | — | — | 64 | 22 | 2.5 | 30 |
| Gelation | no | no | no | no | no | no | no | no | no | no |
| Clogging of Extruder | no | no | no | no | no | no | no | no | no | no |
| Graft Ratio (%) | 46 | 28 | 32 | 52 | 48 | 32 | 44 | 19 | 12 | 16 |

EXAMPLES 1-3

As shown in Table 1, polyethylene terephthalate having various intrinsic viscosities [η] and various end carboxyl group contents and modified polyethylene having various epoxy group contents and various weight-average molecular weights (random copolymers of glycidyl methacrylate and ethylene) were dry-blended in a proportion of 30/70 (by weight ratio), introduced into a double-screw extruder of 45 mm in diameter, and subjected to melt blending at 280° C. and 200 rpm to conduct graft reaction. The residence time in this extruder was about 1 minute.

With respect to each reaction product, MFR, graft ratio, gelation and clogging of the extruder are shown in Table 1.

EXAMPLES 11-14

Polyethylene terephthalate having an intrinsic viscosity [η] and an end carboxyl group content shown in Table 2 as a polyester and modified polyethylene (random copolymer of acrylic acid and ethylene) having a carboxyl group content and a weight-average molecular weight shown in Table 2 were dry-blended in proportions as shown in Table 2.

After that, copolymers were produced under the same conditions as in Example 1, and the properties of the resulting copolymers were measured. The results are shown in Table 2.

TABLE 2

| Composition | Example No. | | | |
|---|---|---|---|---|
| | 11 | 12 | 13 | 14 |
| Polyester | | | | |
| Intrinsic Viscosity [$\eta$] | 0.62 | 0.62 | 0.62 | 0.62 |
| End Carboxyl Group (m.eq./kg) | 37 | 37 | 37 | 37 |
| Modified Polyethylene | | | | |
| Weight-Average Molecular Weight | 100000 | 100000 | 100000 | 100000 |
| Carboxyl Group Content (mol %) | 3.4 | 3.4 | 3.4 | 3.4 |
| Weight Ratio of Polyester/Modified Polyethylene | 10/90 | 30/70 | 50/50 | 90/10 |
| Properties of Graft Copolymer | | | | |
| MFR (g/10 minutes) | | | | |
| (3) | 1.5 | 0.8 | 1.6 | 5.0 |
| (4) | — | — | — | — |
| Gelation | no | no | no | no |
| Clogging of Extruder | no | no | no | no |
| Graft Ratio (%) | 11 | 26 | 14 | 8 |

COMPARATIVE EXAMPLES 1-8

For comparison, polyethylene terephthalate having various intrinsic viscosities [$\eta$] and various end carboxyl group contents and modified polyethylene having various epoxy group or carboxyl group contents and various weight-average molecular weights (random copolymers of glycidyl methacrylate and ethylene, and random copolymers of acrylic acid and ethylene) were dry-blended in a proportion of 30/70 (weight ratio), to produce copolymers in the same manners as in Example 1. The resulting copolymers were measured with respect to their properties. The results are shown in Table 3.

TABLE 3

| Composition | Comparative Example No. | | | | | | | |
|---|---|---|---|---|---|---|---|---|
| | 1 | 2 | 3 | 4 | 5 | 6 | 7 | 8 |
| Polyester | | | | | | | | |
| Intrinsic Viscosity [$\eta$] PET[1] | 0.95 | 0.25 | 0.62 | 0.62 | 0.95 | 0.25 | 0.62 | 0.62 |
| End Carboxyl Group (m-eq./kg) PET[1] | 13 | 105 | 37 | 37 | 13 | 105 | 37 | 37 |
| Modified Polyethylene | | | | | | | | |
| Weight-Average Molecular Weight | 48000 | 48000 | 160000 | 6200 | 100000 | 100000 | 6200 | 200000 |
| Epoxy Group Content (mol %) | 2.5 | 2.5 | 2.6 | 2.5 | — | — | — | — |
| Carboxyl Group Content (mol %) | — | — | — | — | 3.4 | 3.4 | 3.4 | 3.4 |
| Properties of Graft Copolymer | | | | | | | | |
| MFR (g/10 minutes) | | | | | | | | |
| (3) | — | 3.4 | — | 41 | — | 12 | >80 | — |
| (4) | <1 | — | <1 | — | <1 | — | — | <1 |
| Gelation | yes | no | yes | no | yes | no | no | yes |
| Clogging of Extruder | yes | no | yes | no | yes | no | no | yes |
| Graft Ratio (%) | 55 | 4 | 46 | 2 | 45 | 3 | 2 | 48 |

Note:
[1] Polyethylene terephthalate (TR 4550 BH, manufactured by Teijin, Ltd.)
[2] Polybutylene terephthalate (TRB-K, manufactured by Teijin, Ltd.)
[3] Under load of 2160 g.
[4] Under load of 21.6 kg.

As is clear from Tables 1-3, the modified polyolefin-polyester graft copolymers of the present invention show high graft ratios without suffering from gelation due to excess reaction. Accordingly, they are free from extreme decrease in MFR. In addition, since they do not contain gels, the clogging of the extruder can be prevented.

EXAMPLES 15-18

Polypropylene pellets (J 209, manufactured by Tonen Sekiyu Kagaku K.K., MFR=9 g/10 minutes), aromatic polycarbonate (Panlite L 1225, manufactured by Teijin Chemicals, Ltd., weight-average molecular weight: 22,500), and the graft copolymers prepared in Examples 4 and 12 were dry-blended in proportions shown in Table 4 to produce thermoplastic resin composition pellets at 280° C. by using a double-screw extruder. Each of the resulting thermoplastic resin composition pellets was formed into test pieces by injection molding at 270° C. and measured with respect to thermal deformation temperature, dynamic melt viscosity, solvent resistance and surface peel resistance. The results are shown in Table 4.

COMPARATIVE EXAMPLES 9-11

Thermoplastic resin compositions were produced in the same manner as in Example 1 except for using only two components of polypropylene (J 209) and aromatic polycarbonate (Panlite L 1225), and their properties were measured. The results are shown in Table 4.

TABLE 4

| Composition | Example No. | | | | Comparative Example No. | | |
|---|---|---|---|---|---|---|---|
| | 15 | 16 | 17 | 18 | 9 | 10 | 11 |
| Polypropylene (weight %) | 25 | 50 | 75 | 25 | 75 | 50 | 25 |
| Aromatic Polycarbonate (weight %) | 75 | 50 | 25 | 75 | 25 | 50 | 75 |
| Graft Copolymer | | | | | | | |
| Example No. | 4 | 4 | 4 | 12 | — | — | — |
| Parts by Weight (1) | 5 | 5 | 5 | 5 | — | — | — |
| Properties | | | | | | | |
| Thermal Deformation Temp. (°C.) | 140 | 138 | 128 | 140 | 133 | 142 | 145 |
| Dynamic Melt Viscosity at 250° C. ($\times 10^3$ Poise) | 3.7 | 2.5 | 1.5 | 3.8 | 4.7 | 7.3 | 7.5 |

TABLE 4-continued

| Composition | Example No. | | | | Comparative Example No. | | |
|---|---|---|---|---|---|---|---|
| | 15 | 16 | 17 | 18 | 9 | 10 | 11 |
| Solvent Resistance (%) | 0.30 | 0.09 | 0.05 | 0.29 | 0.20 | 0.48 | 1.2 |
| Surface Peel Resistance | 100 | 100 | 100 | 100 | 0 | 0 | 0 |

Note (1): Parts by weight per 100 parts by weight of polypropylene + aromatic polycarbonate.

EXAMPLES 19-23

Bondfast E (manufactured by Sumitomo Chemical Co., Ltd., weight-average molecular weight=73,000, epoxy group content =2.7 mol %) was used as a modified polyolefin, and C 7000N (manufactured by Teijin, Ltd., $[\eta]=1.05$ (measured in an o-chlorophenol solvent at 25° C.), end carboxyl group content =46 milliequivalent/kg) was used as polybutylene terephthalate. C 7000N was sufficiently dried in advance to remove water, and dry-blended with Bondfast E in a weight ratio of 30:70 (Bondfast E: C 7000N). The resulting blend was then subjected to a melt blending at 280° C. for a residence time of about 1 minute in a double-screw extruder.

As a result of isolating a component insoluble in both m-cresol (100° C.) and xylene (100° C.) from the reaction product, it was confirmed that 42.7 weight % of the reaction product was a graft copolymer.

Next, polypropylene pellets (J 209, manufactured by Tonen Sekiyu Kagaku K.K., MFR=9 g/10 minutes), aromatic polycarbonate (Panlite L 1225, manufactured by Teijin Chemicals, Ltd., weight-average molecular weight: 22,500), and the above graft copolymer were dry-blended in proportions shown in Table 5 to produce thermoplastic resin composition pellets at 280° C. by using a double-screw extruder. Each of the resulting thermoplastic resin composition pellets was formed into test pieces by injection molding at 270° C. and measured with respect to thermal deformation temperature, dynamic melt viscosity, solvent resistance and surface peel resistance. The results are shown in Table 5.

EXAMPLE 24

Graft reaction was conducted by melt blending in the same manner as in Example 19 except for using polyethylene terephthalate (TR 8550 manufactured by Teijin, Ltd., $[\eta]=0.75$ (measured in an o-chlorophenol solvent at 25° C.), end carboxyl group content=26 milliequivalent/kg) instead of polybutylene terephthalate. The resulting product was subjected to the same analysis as in Example 19. As a result, it was found that 16.7 weight % of the product was a graft copolymer.

Next, polypropylene pellets (J 209), aromatic polycarbonate (Panlite L 1225) and the above graft copolymer were dry-blended in proportions shown in Table 5 to produce test pieces, and the same measurements were conducted. The results are shown in Table 5.

TABLE 5

| Composition | Example No. | | | | | |
|---|---|---|---|---|---|---|
| | 19 | 20 | 21 | 22 | 23 | 24 |
| Polypropylene (weight %) | 25 | 50 | 75 | 75 | 75 | 75 |
| Aromatic Polycarbonate (weight %) | 75 | 50 | 25 | 25 | 25 | 25 |
| Graft Copolymer | | | | | | |

TABLE 5-continued

| Composition | Example No. | | | | | |
|---|---|---|---|---|---|---|
| | 19 | 20 | 21 | 22 | 23 | 24 |
| Polybutylene Terephthalate (Parts by Weight)* | 5 | 5 | 5 | 10 | 20 | — |
| Polyethylene Terephthalate (Parts by Weight)* | — | — | — | — | — | 5 |
| Properties | | | | | | |
| Thermal Deformation Temp. (°C.) | 140 | 138 | 130 | 127 | 125 | 129 |
| Dynamic Melt Viscosity at 280° C. (× 10³ Poise) | 3.7 | 2.7 | 1.8 | 2.5 | 3.8 | 2.0 |
| Solvent Resistance (%) | 0.75 | 0.36 | 0.16 | 0.12 | 0.10 | 0.16 |
| Surface Peel Resistance | 100 | 100 | 100 | 100 | 100 | 100 |

Note (1): Parts by weight per 100 parts by weight of polypropylene + aromatic polycarbonate.

COMPARATIVE EXAMPLE 12

In the case of using only polypropylene (J 209, 100 weight %), the same measurements as in Example 19 were conducted. The results are shown in Table 6.

COMPARATIVE EXAMPLE 13

In the case of using only aromatic polycarbonate (Panlite L 1225, 100 weight %), the same measurements as in Example 19 were conducted. The results are shown in Table 6.

COMPARATIVE EXAMPLES 14-16

Thermoplastic resin compositions were produced in the same manner as in Example 19 except for using only two components of polypropylene (J 209) and aromatic polycarbonate (Panlite L 1225), and their properties were measured. The results are shown in Table 6.

TABLE 6

| Composition | Comparative Example No. | | | | |
|---|---|---|---|---|---|
| | 12 | 13 | 14 | 15 | 16 |
| Polypropylene (weight %) | 100 | — | 25 | 50 | 75 |
| Aromatic Polycarbonate (weight %) | — | 100 | 75 | 50 | 25 |
| Graft Copolymer (Parts by Weight) | — | — | — | — | — |
| Properties | | | | | |
| Thermal Deformation Temp. (°C.) | 118 | 145 | 143 | 142 | 133 |
| Dynamic Melt Viscosity at 280° C. (× 10³ Poise) | 0.84 | 4.2 | 2.8 | 1.9 | 1.2 |
| Solvent Resistance (%) | 0 | 1.60 | 0.90 | 0.48 | 0.20 |
| Surface Peel Resistance | 100 | 100 | 0 | 0 | 0 |

Note (1): Parts by weight per 100 parts by weight of polypropylene + aromatic polycarbonate.

As is clear from Tables 5 and 6, the thermoplastic resin compositions of the present invention have a better-balanced combination of thermal deformation resistance (expressed by thermal deformation temperature), moldability (expressed by dynamic melt viscosity), surface peel resistance and solvent resistance than the thermoplastic resin composition not containing the graft copolymers.

As described above, in the present invention, since a polyester having an intrinsic viscosity [η] and an end carboxyl group content both in particular ranges and a modified polyolefin having an epoxy group or carboxyl group content and a weight-average molecular weight both in particular ranges are reacted to produce graft copolymers, the graft copolymers do not suffer from decrease in a graft ratio and an extreme decrease in MFR, and are free from gelation due to excess reaction. Accordingly, the clogging of an extruder by the resulting graft copolymers can be effectively prevented.

The modified polyolefin-polyester graft copolymers thus prepared are highly effective as compatibilizers for the polycarbonate resins and the polyolefins.

Since the thermoplastic resin compositions of the present invention comprise aromatic polycarbonates, polyolefins and the above compatibilizers, they show a well-balanced combination of heat resistance, surface peel resistance, moldability, solvent resistance, etc., in addition to excellent impact resistance and other mechanical properties. Such thermoplastic resin compositions are suitable as engineering plastics for automobile parts, etc.

What is claimed is:

1. A modified polyolefin-polyester graft copolymer comprising the reaction product of (a) 10-90 parts by weight of a polyester having an intrinsic viscosity [η] of 0.30-1.20 and an end carboxyl group content of 15-200 milliequivalent/kg, and (b) 90-10 parts by weight of a modified polyolefin having 0.2-5 mol % of an epoxy group or carboxyl group content and a weight-average molecular weight of 8,000-140,000, said modified polyolefin being a random copolymer of an olefin and an unsaturated monomer containing an epoxy group or a carboxyl group, said graft copolymer possessing substantially no gelation and having a graft ratio of from 8% to 52%, wherein graft ratio is the ratio of a graft copolymer insoluble in two organic solvents (100° C. xylene and 100° C. m-cresol) to the graft copolymer and unreacted polyester and modified polyolefin present in the reaction mixture.

2. The modified polyolefin-polyester graft copolymer according to claim 1, wherein said polyester is polyethylene terephthalate having an intrinsic viscosity [η] of 0.30-0.80 and an end carboxyl group content of 15-200 milliequivalent/kg and/or polybutylene terephthalate having an intrinsic viscosity [η] of 0.30-1.20 and an end carboxyl group content of 15-200 milliequivalent/kg.

3. A method of producing a modified polyolefin-polyester graft copolymer comprising the step of reacting (a) 10-90 parts by weight of a polyester having an intrinsic viscosity [η] of 0.30-1.20 and an end carboxyl group content of 15-200 milli-equivalent/kg, with (2) 90-10 parts by weight of a modified polyolefin having a 0.2-5 mol % of epoxy groups or carboxyl groups and a weight-average molecular weight of 8,000-140,000, at 260°-320° C. in an extruder, said modified polyolefin being a random copolymer of an olefin and an unsaturated monomer containing an epoxy group or a carboxyl group, wherein said graft copolymer possesses substantially no gelation and has a graft ratio of from 8% to 52%, wherein graft ratio is the ratio of a graft copolymer insoluble in two organic solvents (100° C. xylene and 100° C. m-cresol) to the graft copolymer and unreacted polyester and modified polyolefin present in the reaction mixture.

4. The method of producing a modified polyolefin-polyester graft copolymer according to claim 3, wherein said polyester is polyethylene terephthalate having an intrinsic viscosity [η] of 0.30-0.80 and an end carboxyl group content of 15-200 milliequivalent/kg, and/or polybutylene terephthalate having an intrinsic viscosity [η] of 0.30-1.20 and an end carboxyl group content of 15-200 milliequivalent/kg.

* * * * *